C. C. SHULTS.

Improvement in Gaveling Attachments for Harvesters.

No. 126,582.

Patented May 7, 1872.

126,582

UNITED STATES PATENT OFFICE.

CHANCY C. SHULTS, OF WAVERLY, IOWA.

IMPROVEMENT IN GAVELING ATTACHMENTS FOR HARVESTERS.

Specification forming part of Letters Patent No. 126,582, dated May 7, 1872.

*To all whom it may concern:*

Be it known that I, CHANCY C. SHULTS, of Waverly, in the county of Bremer and in the State of Iowa, have invented certain new and useful Improvements in Harvesters; and do hereby declare that the following is a full, clear, and exact description thereof, reference being had to the accompanying drawing making a part of this specification, in which—

Figure 1:
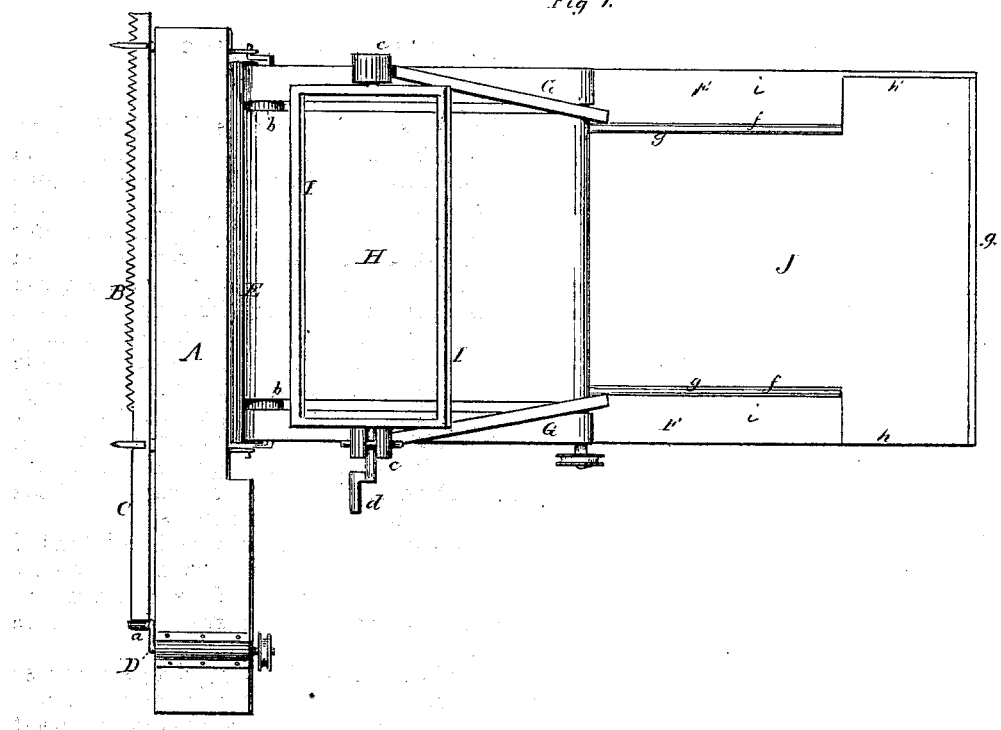
Figure 2:
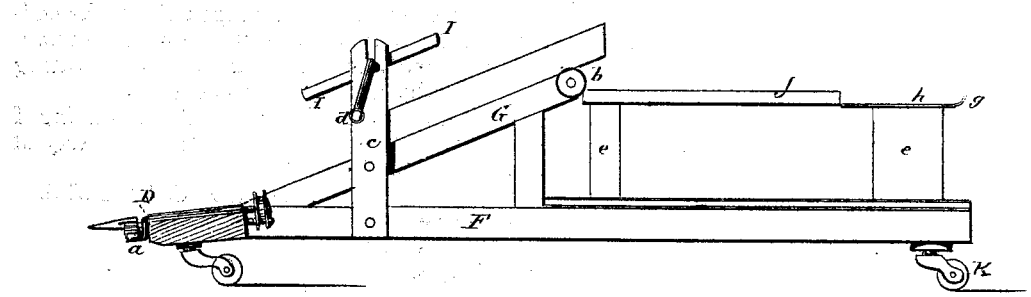

Figure 1 is a top-plan view of my device, and Fig. 2 a side elevation of the same.

Like letters of like kinds denote corresponding parts in each figure.

My invention consists in the construction, arrangement, and operation of the divider for forming gavels, substantially as and for the purpose hereinafter specified.

In the drawing, A represents the finger-bar, and B the sickle-bar, to the inner end of which the outer end of spring-pitman C is rigidly secured. This pitman is made of spring-steel of sufficient flexibility, with its inner end formed with an eye, $a$, or some equivalent, for convenient connection with and operation by its proper driving-crank, D. A metallic shield, E, is secured upon the rear side of the finger-bar, curving above and below said bar, and to the rear for the purpose of protecting the joint between said bar and the apron. To the rear side of the finger-bar is pivoted the frame F, having, upon its front part, the apron-frame G, inclining upward, as shown in the drawing, and provided with rollers, $b$, at each end, which are turned by a proper connection with the traction-wheels of the reaper, and carry an endless apron, H. Upon standards $c$, secured to the sides of the frames F and G, is rotated the metallic grain-divider I, of the form shown in Fig. 1, having a handle, $d$, so weighted as to hold the divider parallel with the line of the apron-frame G. By this divider the cut grain is divided into gavels while on the endless apron, and delivered by the apron onto the platform J, ready for binding. Upon the rear end of the frame F, and upon suitable standards $e$, is the receiver J, which is made of proper sheet metal, with recessed sides, $f$, to leave standing-places $i$, on each side, for the binders, which sides have upturned rims, $g$, and with outlets $h$, through which the bundles may be removed. The rear end of the frame F is mounted upon casters, K.

In the operation of my device, it is intended to have the divider turned by the driver by hand, so as to bring one of its edges downward as often as sufficient grain accumulates upon the apron.

The advantages of my mechanism are so obvious as to require no particular mention.

Having thus described my invention, what I claim as new therein, is—

The grain-divider I, arranged above the endless apron H, provided with the weighted handle $d$, constructed, arranged, and operating substantially as described and shown.

In testimony that I claim the foregoing I have hereunto set my hand this 10th day of November, 1871.

CHANCY C. SHULTS.

Witnesses:
H. S. HOOVER,
H. S. BURR.